United States Patent
Danaj et al.

(10) Patent No.: US 8,360,301 B2
(45) Date of Patent: Jan. 29, 2013

(54) MIXED METAL MAGNETIC PULSE IMPACT BEAM

(75) Inventors: Kenneth G. Danaj, Sterling Heights, MI (US); Richard M. Kleber, Clarkston, MI (US); James C. O'Kane, Shelby Township, MI (US); John R. Bradley, Clarkston, MI (US); John E. Carsley, Clinton Township, MI (US); Kevin K. Parkila, Royal Oak, MI (US); Jeffrey M. Scramlin, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 974 days.

(21) Appl. No.: 12/414,765

(22) Filed: Mar. 31, 2009

(65) Prior Publication Data

US 2010/0242284 A1 Sep. 30, 2010

(51) Int. Cl.
*B23K 20/06* (2006.01)
(52) U.S. Cl. .................................... 228/115; 228/235.1
(58) Field of Classification Search .................... None
See application file for complete search history.

(56) References Cited

U.S. PATENT DOCUMENTS

| | | | | |
|---|---|---|---|---|
| 5,232,261 | A * | 8/1993 | Kuroda et al. | 296/146.4 |
| 5,966,813 | A * | 10/1999 | Durand | 29/897.2 |
| 6,234,375 | B1 * | 5/2001 | Durand | 228/115 |
| 6,255,631 | B1 * | 7/2001 | Kichline et al. | 219/617 |
| 6,290,898 | B1 * | 9/2001 | Lee | 266/104 |
| 6,474,534 | B2 * | 11/2002 | Gabbianelli et al. | 228/131 |
| 6,477,774 | B1 * | 11/2002 | Marando et al. | 29/897.2 |
| 6,548,972 | B2 * | 4/2003 | Takagi | 318/293 |
| 6,812,439 | B1 * | 11/2004 | Durand | 219/617 |
| 6,908,024 | B2 * | 6/2005 | Martin et al. | 228/115 |
| 6,921,013 | B1 * | 7/2005 | Kichline et al. | 228/115 |
| 6,977,361 | B2 * | 12/2005 | Durand | 219/617 |
| 7,015,435 | B2 | 3/2006 | Yablochnikov | |
| 7,127,816 | B2 | 10/2006 | Kiehl | |
| 2004/0155030 | A1 * | 8/2004 | Schmidt | 219/603 |
| 2006/0032895 | A1 * | 2/2006 | Durand et al. | 228/234.1 |
| 2008/0120844 | A1 * | 5/2008 | Yang et al. | 29/897.2 |

FOREIGN PATENT DOCUMENTS

| | | |
|---|---|---|
| DE | 102005010007 | 9/2005 |
| DE | 602004002817 | 2/2007 |

* cited by examiner

*Primary Examiner* — Kiley Stoner
(74) *Attorney, Agent, or Firm* — Quinn Law Group, PLLC

(57) ABSTRACT

An impact beam assembly includes a beam of high-strength steel, and a pair of end brackets constructed of a dissimilar material than the high-strength steel. The brackets are locally deformed onto the beam to thereby surround a portion of the beam. Once deformed, the brackets define a flat section suitable for welding to a vehicle door panel, as well as a section for retaining the beam. The beam can include a surface feature suitable for retaining the beam to the end brackets. A method of reinforcing a vehicle door assembly includes positioning the beam with respect to the end brackets such that the brackets surround a portion of the beam, and then activating a magnetic pulse coil (MPC) to deform an overlapping portion of the brackets onto the beam. The brackets are then attached to a surface of the door assembly to reinforce the door assembly.

5 Claims, 3 Drawing Sheets

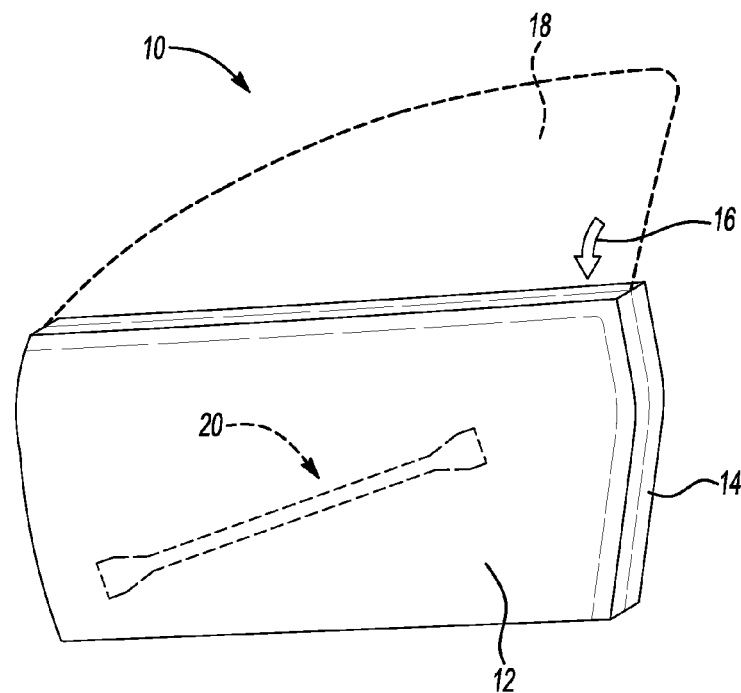
_Fig-1_
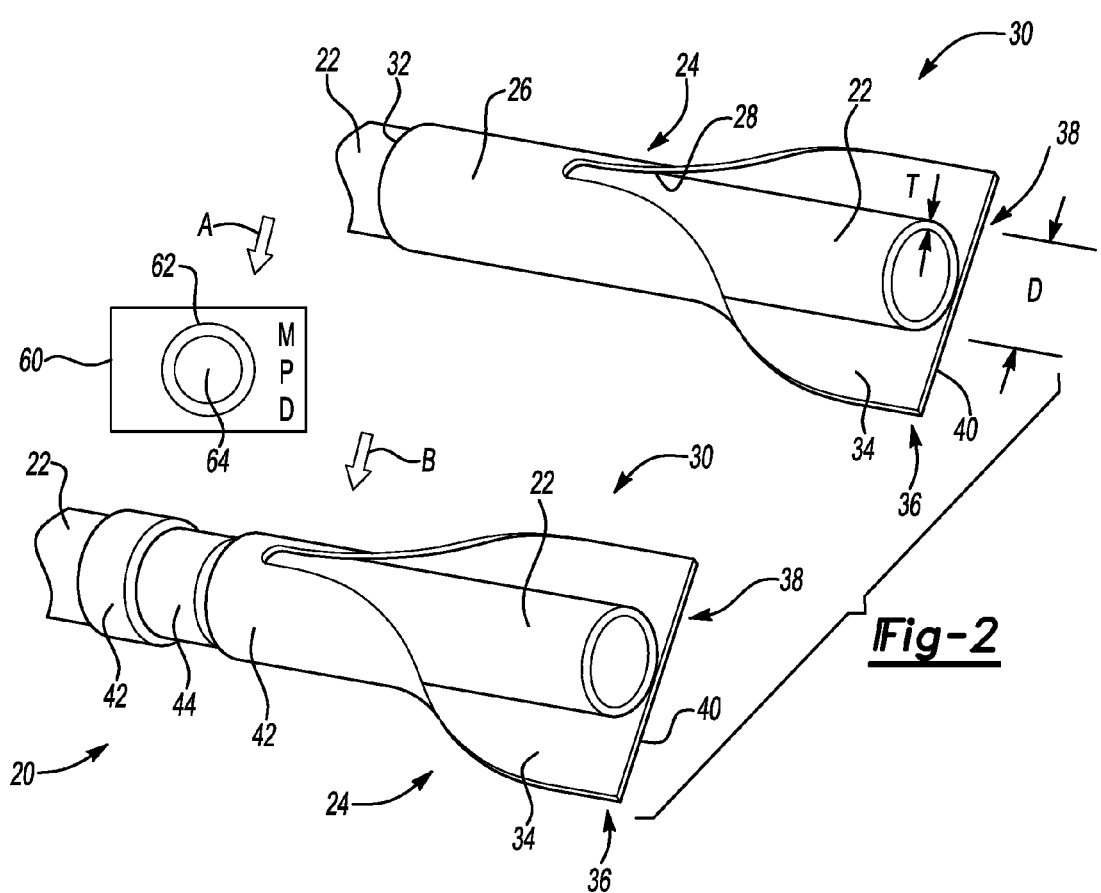
_Fig-2_

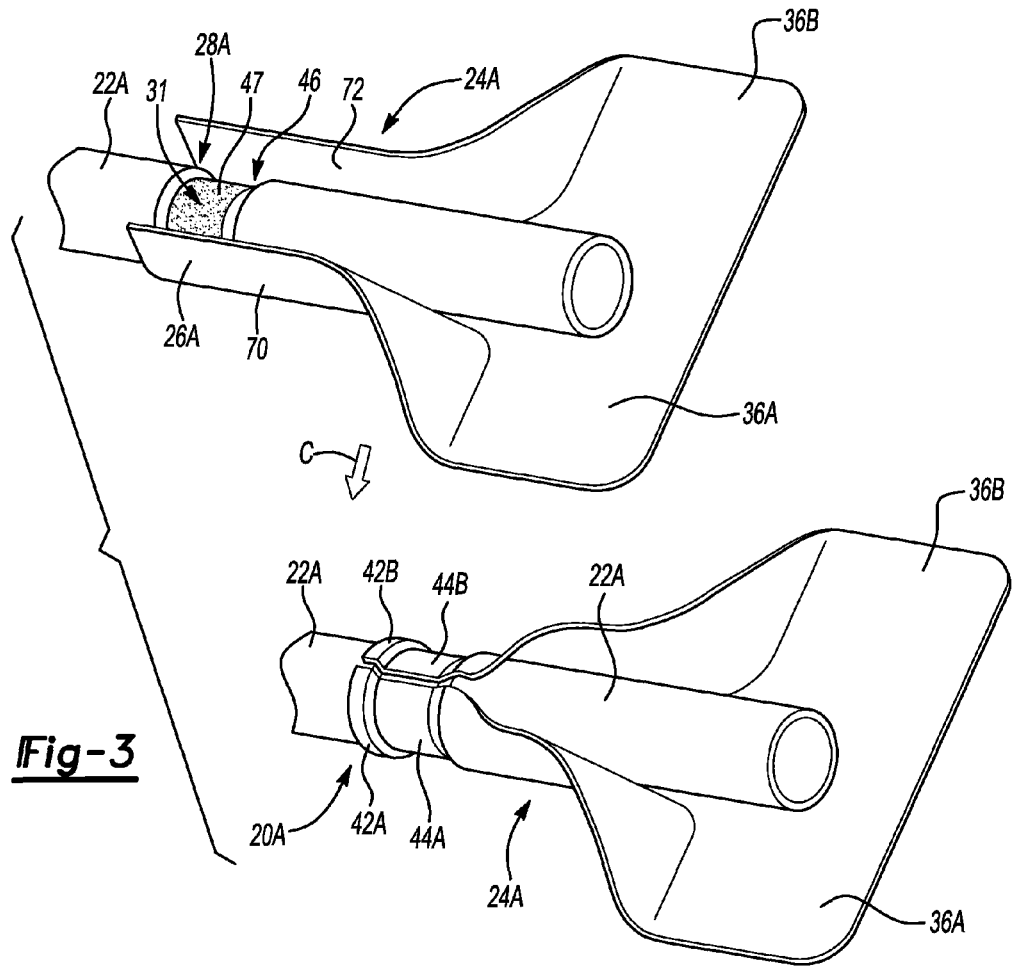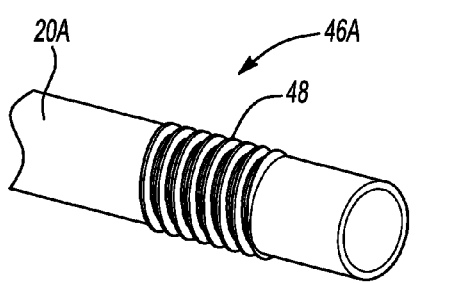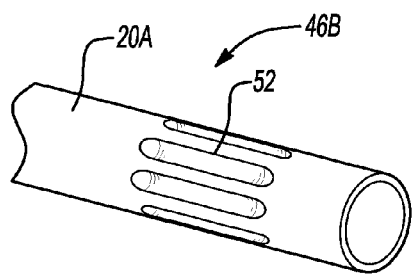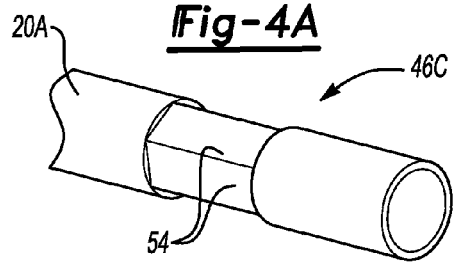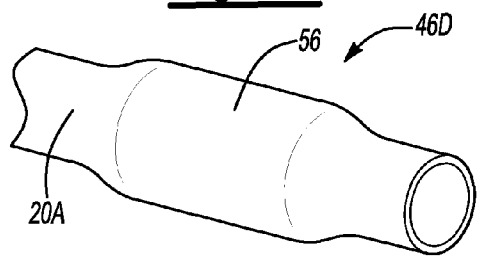

MIXED METAL MAGNETIC PULSE IMPACT BEAM

TECHNICAL FIELD

The present invention relates generally to an impact beam for reinforcing a portion of a vehicle body, and more particularly to a high-strength mixed metal impact beam for reinforcing a vehicular door assembly or other vehicle body panel.

BACKGROUND OF THE INVENTION

In order to improve vehicle structural integrity, high-strength impact beams constructed of steel or other suitable impact-resistant material can be integrated into a vehicle body, for example by welding the impact beam into a door assembly. However, there is ordinarily a very limited amount of available space between an outer panel of the door assembly and any window glass and any internal mechanisms of the door assembly when the window glass is in a dropped position. As a result, there are limited options for integrating an impact beam within a vehicle door assembly, as well as a limited number of useful configurations of the impact beam itself.

Additionally, in order to achieve ever increasing fuel economy standards, the reduction of weight and mass of modern vehicles is typically an overarching design goal. It is therefore common practice to use aluminum, magnesium, and/or composite materials in constructing vehicle bodies and components. While such light-weight materials are desirable from a vehicle mass reduction standpoint, packaging space limitations as noted above can limit the effectiveness of impact beams constructed from such materials, which often must be enlarged in order to provide strength that is equal to that of an impact beam constructed of a high-strength material such as steel.

SUMMARY OF THE INVENTION

Accordingly, a method is provided that allows high-strength impact beams to be integrated into a low-mass vehicle body panel, such as but not limited to a door assembly or another closure panel assembly. The low-mass vehicle panel can be constructed of aluminum, magnesium, composite materials, and/or other relatively lightweight or low-mass materials in order to reduce the overall weight and mass of the vehicle. The combination of an impact beam constructed in accordance with the invention with a low-mass vehicular panel assembly provides a low-mass design with optimal structural integrity. Additionally, the formation method utilizes a mechanical deformation or fastening technique to form an mechanical interlock between different components of the impact beam assembly, and as a result provides a relatively low cost solution.

In particular, a method of reinforcing a vehicle door assembly or other vehicle panel assembly includes positioning a steel beam with respect to an end bracket such that the end bracket surrounds or circumscribes at least a portion of the steel beam. The steel beam can be fabricated or configured, for example, as a tubular beam having a circular, rectangular, or other suitable cross-sectional shape, an extruded beam with a cross section designed for optimal stiffness, or any other suitable beam design. The method further includes activating a magnetic pulse coil (MPC) to thereby selectively deform an overlapping portion of the end bracket, i.e., a portion of the end bracket that surrounds or circumscribes a portion of the steel beam to thereby overlap a perimeter or circumference thereof, and to thereby form a mechanical joint or interlock in conjunction with the steel beam. The end bracket is then fastened or otherwise attached to an inner surface of the vehicle door assembly for reinforcement of the vehicle door assembly. A substantially similar end bracket is positioned on either end of the steel beam, with each end bracket deformed to the steel beam using an MPC or MPC-based process as noted above, or any other suitable mechanical deformation process producing the desired mechanical interlock as set forth below.

Additionally, an impact beam assembly for reinforcing a vehicle panel, such as but not limited to a vehicle door assembly, includes a pair of end brackets, as well as a beam constructed of high-strength steel. The end brackets are each configured for receiving a different end of the beam. To further reduce weight and mass, and to facilitate joining of the brackets to the door assembly, the end brackets can be constructed of a material that is substantially the same as the door construction and dissimilar to that of the high-strength steel, e.g., aluminum, magnesium, and/or other suitable material. The end brackets are locally deformed onto the beam to thereby surround or circumscribe at least a portion of the beam. The end brackets each include a splayed portion defining a flat section suitably adapted for welding or fastening to a surface of the vehicle panel. The end brackets also define a section suitable for retaining the beam. The beam can optionally include a surface feature for further retaining the beam to the end brackets as set forth hereinbelow.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of an exemplary reinforced vehicle door assembly in accordance with the invention;

FIG. 2 is a schematic illustration of an impact beam assembly usable for reinforcing the vehicle door assembly of FIG. 1;

FIG. 3 is a schematic illustration of another embodiment of an impact beam assembly usable for reinforcing the vehicle door assembly of FIG. 1;

FIG. 4A is a schematic illustration of an exemplary alternate steel beam that is usable with the impact beam assembly of FIGS. 1 and 2;

FIG. 4B is a schematic illustration of a second alternate steel beam that is usable with the impact beam assembly of FIGS. 1 and 2;

FIG. 4C is a schematic illustration of a third alternate steel beam that is usable with the impact beam assembly of FIGS. 1 and 2;

FIG. 4D is a schematic illustration of a fourth alternate steel beam that is usable with the impact beam assembly of FIGS. 1 and 2.

DESCRIPTION OF THE PREFERRED EMBODIMENTS

Figure 5:
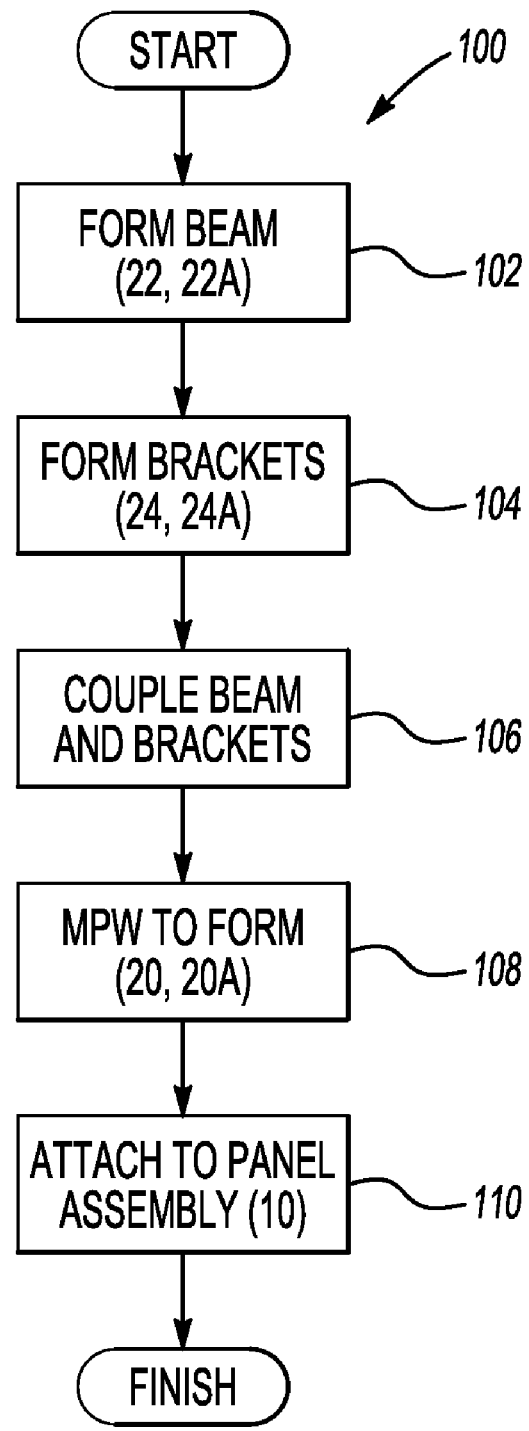
FIG. 5 is a graphical flow chart describing a method for forming an impact beam assembly by deformation or crimping using a magnetic pulse coil (MPC).

Referring to the drawings wherein like reference numbers correspond to like or similar components throughout the several figures, and beginning with FIG. 1, a vehicle door assembly 10 includes an inner panel 12 and an outer panel 14. The inner panel 12 and the outer panel 14 together define an internal space or a cavity 16. The door assembly 10, which can be connected to a vehicle body (not shown) and used for entry and egress from a vehicle interior or passenger compartment, further includes window glass 18. The window glass 18 can be selectively raised to the position shown in FIG. 1 or lowered into the cavity 16 using an automatic or a manual actuator device (not shown).

Within the scope of the invention, the door assembly 10 can be constructed or fabricated of a relatively lightweight or low-mass material such as aluminum, magnesium, a composite material, an alloy, and/or any other suitable lightweight or low-mass material. Such materials are expected to optimize the fuel economy of any vehicle using the door assembly 10. In order to also optimize the structural integrity of the door assembly 10 without significantly increasing weight and mass, an impact beam assembly 20 is provided therein that is constructed in accordance with the invention as set forth below. That is, the impact beam assembly 20, which is constructed at least partially of a cylindrical, tubular, or extruded high-strength steel is welded, bolted, and/or otherwise fastened to surfaces of one or both of the inner panel 12 and the outer panel 14.

Referring to FIG. 2, the impact beam assembly 20 of FIG. 1 includes a beam 22 and an end bracket 24. While only one end bracket 24 is shown in FIG. 2, it is understood that an identical or substantially similarly configured end bracket 24 is disposed at the opposite end of the impact beam assembly 20, as best shown in FIG. 1. The beam 22 is constructed of high-strength steel having an exemplary cross-section of a diameter D and a thickness T, and having a length that is dependent on the size and shape of the door assembly 10 of FIG. 1. Those of ordinary skill in the art will recognize that the cross-sectional shape and configuration of the beam 22 can vary without departing from the intended scope of the invention. However, if the beam 22 is configured with a cross-sectional shape that is something other than circular as shown, the Magnetic Pulse Device (MPD) 60 described below can be modified to provide the required deformation of the end bracket 24 to the beam 22.

The end bracket 24 can be configured as a section of lightweight/low-mass metallic or other suitable material. In one embodiment, the end bracket 24 is constructed of aluminum, while in another embodiment the end bracket 24 is constructed of magnesium. However, the end bracket 24 can also be constructed of steel and/or other suitable materials, depending on the desired weight/mass goals of the impact beam assembly 20. Regardless of the materials of construction, in the embodiment of FIG. 2 the end bracket 24 includes an open section 26 and a splayed section 30, with a slot 28 defined within or by the open section 26 opening to the splayed section 30. The open section 26 has an end 32 with a diameter that is slightly larger than the diameter D of the beam 22 in order to allow the beam 22 to be inserted with minimal resistance into the end 32, through the open section 26, for ultimate positioning adjacent to a flat surface 34 and near an edge 40 of the splayed section 30.

To provide additional structural integrity, the open section 26 can be adapted to include a bonding material 31 (see FIG. 3) such as adhesive material applied at or along an interface between the end bracket 24 and the beam 22 prior to deformation. Such an adhesive material could include glass beads to ensure that the adhesive material is not forced out during deformation. Instead or in addition to adhesive material, abrasive particles or materials could be used at the interface between the end bracket 24 and the beam 22 to promote an optimal mechanical interlock or bond between the end bracket and beam 22 upon deformation of the end bracket 24 as described below.

The slot 28 can be cut or formed in or from the open section 26 in such a manner as to facilitate the spreading of opposing portions 36 and 38 into a desired shape or configuration suitable for welding or fastening into the door assembly 10 of FIG. 1. That is, while a substantially flat design as shown in FIG. 2 can facilitate such welding or fastening, while also providing a simplified geometry for placement within the confined space 16 of the door assembly 10 (see FIG. 1), other shapes or configurations can be envisioned for the end bracket 24 without departing from the intended scope of the invention.

Still referring to FIG. 2, once the beam 22 is inserted into the end bracket 24 as set forth above, the loosely coupled beam 22 and end bracket 24 are moved into a magnetic pulse device (MPD) 60, as indicated by the arrow A, wherein the beam 22 and end bracket 24 are subjected to a controlled deformation and/or welding process, thus forming a mechanical interlock between the beam 22 and each end bracket 24. The impact beam assembly 20 thus emerges from the MPD 60, as indicated generally by the arrow B.

Within the scope of the invention, the MPD 60 is configured as a solid-state capacitance-based welding device having a conductive coil 62 surrounding a focal point 64. Objects being joined, in this instance the beam 22 and the end bracket 24, are positioned concentrically within the opening of the coil. Upon discharge of the capacitor, a large current pulse passes through the coil. The current pulse rise time is usually less than approximately 100 microseconds. The rapid discharge of energy provides a negligible amount of heating of the materials of construction of the beam 22 and end bracket 24.

Discharged electrical current runs through the conductive coil 62, which surrounds but does not physically contact the beam 22 or the end bracket 24. The electrical current in the conductive coil 62 ultimately generates an eddy current within the open section 26 of the end bracket 24. As will be understood by those of ordinary skill in the art, the electrical current in the conductive coil 62, as well as the eddy current generated in the end bracket 24, each produces an opposing magnetic field. The repulsive magnetic force generated between the coil 62 and the end bracket 24 ultimately repels the end bracket 24 away from the coil 62 and toward the beam 22 at a relatively high velocity. The end bracket 24 is thereby deformed around, molded to, or otherwise joined to the beam 22 to form a mechanical interlock therebetween, and the joined impact beam assembly 20 emerges from the MPD 60 as generally indicated by arrow B.

After deformation within the MPD 60, unaffected portions 42 of the end bracket 24 are left in a non-deformed state, while affected portions 44 within the primary coil of the MPD 60 are deformed inward at a high rate of speed, as noted above. The mechanical deformation may cause the components to be joined or coupled into a singular structure having a mechanical joint that is structurally sound, or deformed into an interference fit between the components capable of withstanding the predicted service loads. The flat surface 34 of the end bracket 24 can then be welded or fastened into the door assembly 10 of FIG. 1.

Referring to FIG. 3, another embodiment of the impact beam assembly 20 is shown as the impact beam assembly 20A. A beam 22A having a surface feature 46 provides an additional mechanical interlock between a beam 22A and an end bracket 24A after the magnetic pulse deformation process. In the exemplary embodiment of FIG. 3, the surface feature 46 is a diametric reduction area 47, i.e., an annular zone having a diameter that is less than the diameter D. Alternate forms of the surface feature 46 can be used without departing from the intended scope of the invention. As noted above, bonding material 31 can be optionally provided at an interface between the end bracket 24A and the beam 22A to optimize the mechanical interlock therebetween. While shown only in FIG. 3 for simplicity, the bonding material 31 can also be used with the embodiment of FIG. 2, as will be understood by those of ordinary skill in the art.

For example, the surface feature 46 can be alternately embodied as a surface feature 46A in the form of a set of threads 48 as shown in FIG. 4A. Alternately, a surface feature 46B can be provided in the form of a set of axial grooves 52 as shown in FIG. 4B. As another option, a surface feature 46C can be a set of adjacent flat zones 54 as shown in FIG. 4C. As yet another option, a surface feature 46D can be provided in the form of a diametric expansion area 56, i.e., a zone or area having a diameter that is greater than the diameter D.

Referring again to FIG. 3, rather than starting with a modified tubular end bracket 24 as shown in FIG. 2, the end bracket 24A can be alternately formed or configured from a flat piece of sheet metal. The formed sheet metal design allows for relatively larger attachment areas 36A and 36B for the impact beam assembly 20A to weld to or fasten into the door assembly 10 (see FIG. 1). Upended portions 70 and 72 of an open section 26A of the end bracket 20A form an alternate slot 28A for placement of the beam 22A in preparation for the MPD process. Upended portions 70 and 72 may be brought together and welded to provide a circular open end in a supplementary operation. Thus the bracket can be fabricated from a sheet metal blank rather than from tubing. The circular open end, as opposed to the upstanding flange design, simplifies coil design and the joining process.

After welding or deformation, i.e., after the impact beam assembly 20A emerges from the MPD 60 (see FIG. 2) as generally indicated by arrow C, the upended portions 70 and 72 of the end bracket 20A are inwardly deformed onto the beam 22A, thus following the contours of the beam 22A. The affected portions 44A and 44B of the upended portions 70 and 72 conform to the shape of the surface feature 46 to form an interlock between the beam 22A and the end bracket 24A. Unaffected portions 42A and 42B are not deformed with respect to the beam 22A, although the unaffected portions 42A and 42B can be bent, crimped, folded, or otherwise shaped during processing by the MPD 60. The beam 22A and the end bracket 24A may also be welded into a singular structure in the MPD process in addition to the interlocking engagement.

Referring to FIG. 5, a method 100 for forming the impact beam assembly 20, 20A begins with step 102, wherein in one exemplary embodiment the beam 22, 22A can be fabricated or formed into a tubular shape, as best shown in FIGS. 2 and 3. In this exemplary embodiment, the beam 22, 22A is formed of high-strength steel, such as low-carbon steel, and with a circular or at least generally circular cross-section. In the embodiment of FIG. 2, the beam 22 is formed of a substantially smooth or featureless length of cylindrical tubing, while in the embodiment of FIG. 3, the beam 22A includes one or more surface features 46 as set forth above.

Once formed at step 102, the method 100 includes fabricating or forming the end brackets 24, 24A at step 104. In an exemplary embodiment, the end brackets 24, 24A are constructed of a reduced mass material, i.e., a dissimilar and lighter weight material than that of the beam 22, 22A. For example, aluminum, magnesium, or a composite material may be used to construct the end brackets 24, 24A.

When fabricating the end brackets 24, as shown in FIG. 2, step 104 can include slitting or cutting a length of tubing along at least half of its length L, and then bending, unfolding, and/or shaping the cut end of the tubing to form the flat surface 34. When fabricating the end brackets 24A as shown in FIG. 3, step 104 can include bending, folding, or shaping a generally rectangular piece of sheet metal to form the slot 28A in an open section 26A in the form of a channel. In either embodiment, the diameter of the slot 28, 28A is slightly larger than the diameter (D) of the beam 22, 22A.

At step 106, the beam 22, 22A is loosely coupled with the end brackets 24, 24A. In the embodiment of FIG. 2, the beam 22 is inserted into the end 32 of the end bracket 24 until the beam 22 is positioned adjacent to the edge 40 as shown in FIG. 2. In the embodiment of FIG. 3, the beam 22A is positioned within the slot 28A and adjacent the edge 40. Once positioned in this manner, the method 100 proceeds to step 108.

At step 108, the loosely coupled beam 22, 22A and end brackets 24, 24A are placed within the MPD 60, which is discharged as explained above to thereby form the impact beam assembly 20. If the user of the method 100 is a manufacturer of the impact beam assembly 20, the method 100 can end with step 108. However, method 100 can further include step 110, wherein the impact beam assembly 20 installs the impact beam assembly 20 within the door assembly 10, i.e., by welding and/or fastening the impact beam assembly 20 to one or both of the inner panel 12 and outer panel 14 of the door assembly 10.

While the best modes for carrying out the invention have been described in detail, those familiar with the art to which this invention relates will recognize various alternative designs and embodiments for practicing the invention within the scope of the appended claims.

The invention claimed is:

1. A method of forming an impact beam assembly, the method comprising:
   positioning a steel beam with respect to an end bracket such that the end bracket surrounds at least a portion of the steel beam to thereby define an overlapping portion of the end bracket;
   providing at least one of an adhesive material and an abrasive material between the overlapping portion and the steel beam;
   activating a magnetic pulse device (MPD) to thereby generate an eddy current in the end bracket; and
   deforming the overlapping portion onto the steel beam using the eddy current to thereby form a mechanical interlock between the end bracket and the steel beam.

2. The method of claim 1, wherein positioning a steel beam includes: inserting the steel beam into an opening at one end of the end bracket.

3. The method of claim 1, wherein the opening is one of a circular opening and an elongated slot.

4. The method of claim 1, further comprising attaching the end brackets to a surface of a vehicle door assembly to thereby reinforce the vehicle door assembly.

5. The method of claim 1, wherein positioning a steel beam with respect to an end bracket includes positioning the steel beam at least partially inside of a pair of end brackets each constructed of at least one of aluminum and magnesium.

* * * * *